(12) United States Patent
Meissner

(10) Patent No.: US 9,686,975 B2
(45) Date of Patent: *Jun. 27, 2017

(54) ANIMAL TRAP

(71) Applicant: Paul James Meissner, Camarillo, CA (US)

(72) Inventor: Paul James Meissner, Camarillo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/268,431

(22) Filed: Sep. 16, 2016

(65) Prior Publication Data

US 2017/0000104 A1    Jan. 5, 2017

Related U.S. Application Data

(63) Continuation of application No. 13/439,774, filed on Apr. 4, 2012.

(51) Int. Cl.

| | |
|---|---|
| *A01M 23/34* | (2006.01) |
| *A01M 23/14* | (2006.01) |
| *A01M 23/36* | (2006.01) |
| *A01M 27/00* | (2006.01) |
| *A01M 23/24* | (2006.01) |

(52) U.S. Cl.
CPC ............ *A01M 23/14* (2013.01); *A01M 23/24* (2013.01); *A01M 23/34* (2013.01); *A01M 23/36* (2013.01); *A01M 27/00* (2013.01)

(58) Field of Classification Search
CPC .......... A01M 23/24; A01M 23/34; B25J 1/02
USPC ................. 43/60, 73, 77, 85–89, 92, 93, 95; 294/209–211
See application file for complete search history.

(56) References Cited

U.S. PATENT DOCUMENTS

| | | | | |
|---|---|---|---|---|
| 1,467,832 | A * | 9/1923 | Booth ................. | A01M 23/265 43/82 |
| 6,223,628 | B1 * | 5/2001 | Barron ..................... | H01K 3/32 294/106 |
| 6,361,094 | B1 * | 3/2002 | Pelley .................... | A63B 47/02 294/115 |
| 8,104,806 | B1 * | 1/2012 | Shih .......................... | B25J 1/02 294/100 |
| 2005/0057055 | A1 * | 3/2005 | Deal ........................ | B25J 1/02 294/111 |

* cited by examiner

*Primary Examiner* — Darren W Ark
*Assistant Examiner* — Danielle Clerkley
(74) *Attorney, Agent, or Firm* — Zilka-Kotab, P.C.

(57) ABSTRACT

An animal trap according to one embodiment includes a first portion having an upper and a lower end; a second portion in sliding relationship with the first portion, wherein the first and second portions are relatively positionable between a cocked position and a deployed position; a biasing mechanism for biasing the first and second portions towards the deployed position; at least three unique members extending from the lower end of the first portion; a bottom portion coupled to a distal end of each of the unique members; and a trigger mechanism for selectively locking the first and second portions in the cocked position, the trigger mechanism having a trigger extending between the at least three unique members, wherein actuation of the trigger causes a release of the first and second portions from the cocked position. Additional embodiments are also disclosed.

20 Claims, 10 Drawing Sheets

ANIMAL TRAP

FIELD OF THE INVENTION

The present invention relates to animal traps, and more particularly, this invention relates to at least partially subterranean, mechanical animal traps.

BACKGROUND

Many different subterranean animal traps exist in the marketplace today. However, to set these traps, often times a hole must be dug down to the depth where the animals travel and/or live. Also, in some cases, the animal trap may become misaligned once it is set and the hole is covered, thereby compromising the trap's effectiveness. Moreover, there is usually no way to know if the buried trap has been sprung or not; therefore it may be required to dig up the trap periodically to check on its status.

Conventional traps which include poison are also highly undesirable as they can be harmful to people who may come into close proximity to it. The poison may also contaminate the ground and/or the groundwater thereby resulting in undesirable and unintended effects. Moreover, poisons can be expensive as well as unavailable to the general public, thereby making them an undesirable solution to animal control.

Thus, such conventional products tend to increase user interaction, thereby decreasing their effectiveness and ease of operation. Therefore, it would be beneficial to have an animal trap product which possesses a more efficient design and/or mechanical properties.

SUMMARY

An animal trap according to one embodiment includes a first portion having an upper and a lower end; a second portion in sliding relationship with the first portion, wherein the first and second portions are relatively positionable between a cocked position and a deployed position; a biasing mechanism for biasing the first and second portions towards the deployed position; at least three unique members extending from the lower end of the first portion; a bottom portion coupled to a distal end of each of the unique members; and a trigger mechanism for selectively locking the first and second portions in the cocked position, the trigger mechanism having a trigger, wherein actuation of the trigger causes a release of the first and second portions from the cocked position.

An animal trap according to another embodiment includes a first portion having an upper and a lower end; a second portion in sliding relationship with the first portion, wherein the first and second portions are relatively positionable between a cocked position and a deployed position; a biasing mechanism for biasing the first and second portions towards the deployed position; at least three unique members extending from the lower end of the first portion; a bottom portion coupled to a distal end of each of the unique members, the bottom portion being farther from the second portion when the first and second portions are in the cocked position than when in the deployed position; and a trigger mechanism for selectively locking the first and second portions in the cocked position, wherein actuation of the trigger causes a release of the first and second portions from the cocked position.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of an animal trap and/or related systems and methods.

In one general embodiment, an animal trap includes a first portion having an upper and a lower end; a second portion in sliding relationship with the first portion, wherein the first and second portions are relatively positionable between a cocked position and a deployed position; a biasing mechanism for biasing the first and second portions towards the deployed position; at least three unique members extending from the lower end of the first portion; a bottom portion coupled to a distal end of each of the unique members; and a trigger mechanism for selectively locking the first and second portions in the cocked position, the trigger mechanism having a trigger, wherein actuation of the trigger causes a release of the first and second portions from the cocked position.

In another general embodiment, an animal trap includes a first portion having an upper and a lower end; a second portion in sliding relationship with the first portion, wherein the first and second portions are relatively positionable between a cocked position and a deployed position; a biasing mechanism for biasing the first and second portions towards the deployed position; at least three unique members extending from the lower end of the first portion; a bottom portion coupled to a distal end of each of the unique members, the bottom portion being farther from the second portion when the first and second portions are in the cocked position than when in the deployed position; and a trigger mechanism for selectively locking the first and second portions in the cocked position, wherein actuation of the trigger causes a release of the first and second portions from the cocked position.

Figure 1:
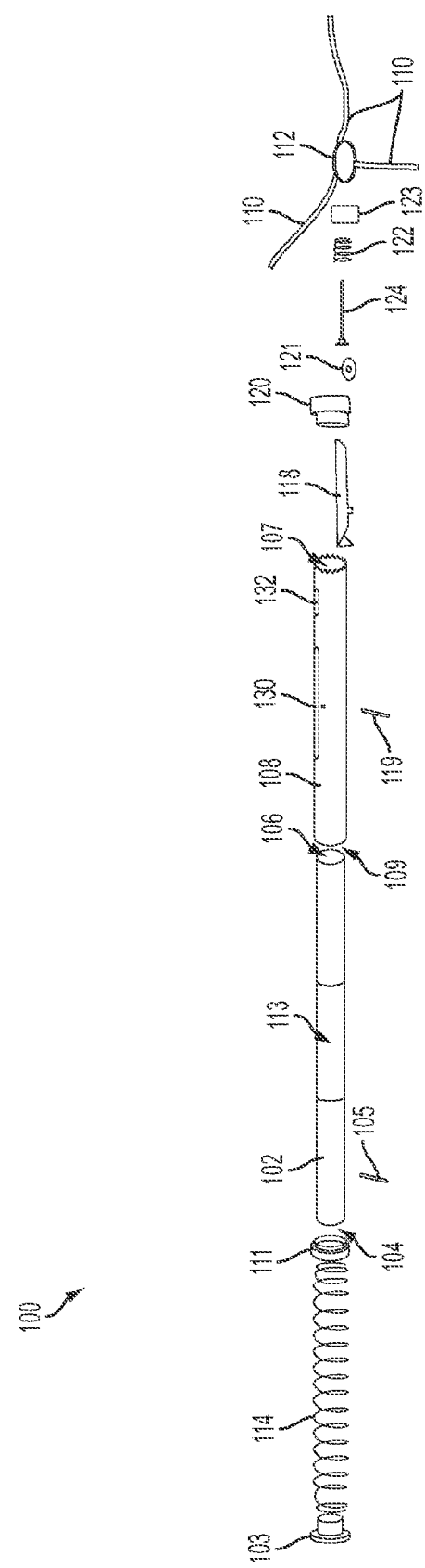
FIG. 1 is an exploded view of an animal trap according to one embodiment.

FIG. 1 depicts an animal trap 100 for trapping animals, in accordance with one embodiment. As an option, the present animal trap 100 may be implemented in conjunction with features from any other embodiment listed herein, such as those described with reference to the other FIGS. Of course, however, such animal trap 100 and others presented herein may be used in various applications and/or in permutations which may or may not be specifically described in the illustrative embodiments listed herein. Further, the animal trap 100 presented herein may be used in any desired environment. Moreover, common numbering may be implemented for some and/or all of the FIGS. presented herein.

Figure 2:
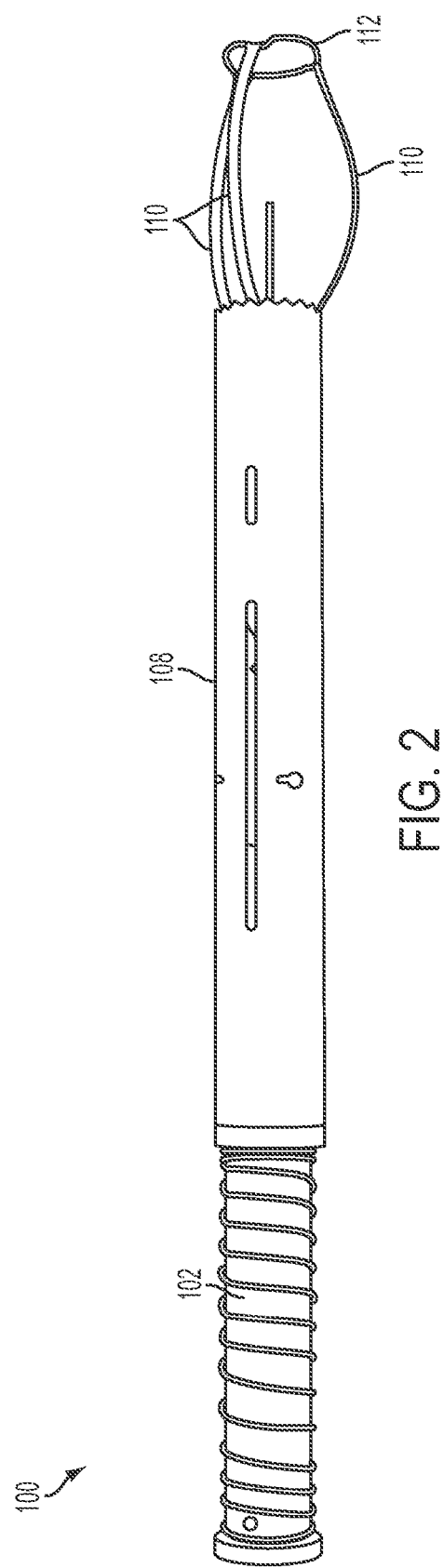
FIG. 2 is a cocked side view of an animal trap according to one embodiment.
Figure 3:
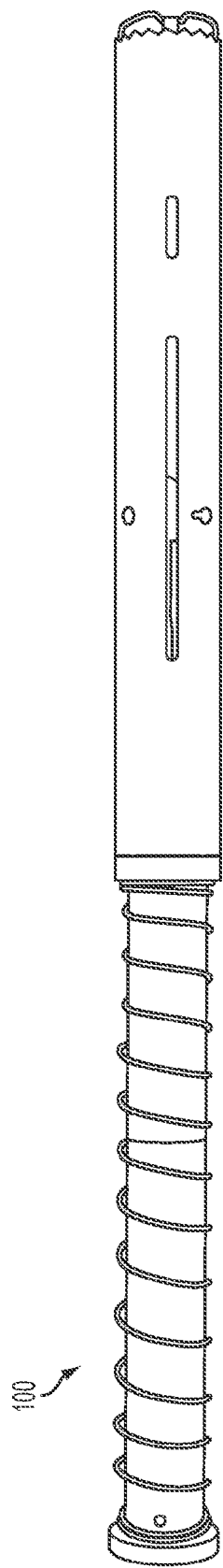
FIG. 3 is a deployed side view of the animal trap according of FIG. 2.

Referring now to FIGS. 1-3, the animal trap 100 includes a first portion 102 having an upper and lower end 104, 106. As shown in FIG. 1, a cap 103 may be coupled to the upper end 104, e.g., by a pin 105, an adhesive, frictional coupling, etc. The cap 103 retains a biasing mechanism 114, an example of which is described in more detail below. Of course, other approaches may be used instead of a cap and/or external biasing mechanism as shown, such as an integral flange extending around the upper end 104, an internal biasing mechanism abutting an internal portion of the first portion, etc.

With continued reference to FIG. 1, the animal trap 100 includes a second portion 108 in sliding relationship with the first portion 102. Moreover, the first and second portions 102, 108 may be relatively positionable between a cocked position and a deployed position, as depicted in FIGS. 2 and 3, respectively. According to various approaches, the second portion may be positioned outside the first portion, the first portion may be positioned outside the second portion, etc.

With continued reference to FIG. 1, the lower end 107 of the second portion 108 may preferably be serrated to better capture an animal which may trip the trigger mechanism which is described in further detail below. In other approaches, the lower end of the second portions may be flat, a sharp edge, etc. or any other texture which would be apparent to one skilled in the art upon reading the present description.

As shown in FIG. 1, a sleeve member 111 may be coupled to the upper end 109 of the second portion 108, e.g., to retain the biasing mechanism 114. Alternative approaches may use any type of mechanism to engage or retain the biasing mechanism, such as an integral flange, a pin, an internal member in an approach where the biasing mechanism is internal, etc.

In another approach, the animal trap may include an indicator 113 that is visible when the first and second portions are in a deployed position. In the embodiment shown, the indicator is a colored region on the first portion. According to various approaches, the indicator may include a visibly distinct portion of the first and/or second portions, a light source, an audio source, a wireless signal which is relayed to a receiver, a flag, etc. or any other indicator which would be apparent to one skilled in the art upon reading the present description.

This indicator preferably notifies a user if the trap has been deployed, even when the lower end of the second portion is submerged below the ground. Thus the relative position between the first and second portions may be discerned without removing the trap from its partially submerged location.

With reference to FIGS. 2 and 4, the animal trap 100 includes members 110 extending from the lower end 106 of the first portion 102. Furthermore, the members 110 protrude beyond the second portion 108 when the second portion 108 and the first portion 102 are in the cocked position as shown.

The animal trap 100 additionally includes a bottom portion 112 e.g. a ring, a plate, etc. coupled to distal ends of the members 110. In one approach, the bottom portion may be coupled to the lower end of the first portion. In another approach, the members may extend between the lower end of the first portion and the bottom portion, explained in detail below. Preferably, the bottom portion may be rigid or substantially inflexible such that it may retain its general shape when in the cocked and/or deployed position.

Moreover, the bottom portion 112 may be farther from the second portion 108 when the first and second portions 102, 108 are in the cocked position than when in the deployed position. Preferably, the bottom portion 112 is about adjacent a lower end 107 of the second portion 108 when in the deployed position. According to the present description, "about adjacent" may most preferably signify a state in which the bottom portion and the lower end are close enough together to trap a part of an animal which may trip the trigger mechanism, explained in more detail below. According to various approaches, "about adjacent" may be perfectly adjacent, the bottom portion being recessed into the second portion, be within a range of values, etc. In one illustrative example, "about adjacent" may be within the range of about ±1 in to about ±0.1 in between the bottom portion and the lower end of the second portion; but may be more or less depending on the desired embodiment.

According to various approaches, the overall length of the animal trap as measured by the dimension between the furthest most ends of the animal trap in the cocked position may be between about 6 in (inch) and about 36 in, but could be higher or lower based on the desired embodiment. In other approaches, the dimension between the bottom portion 112 and the lower end 107 of the second portion when the trap is in the cocked position may be from about 1 in to about 12 in, but may be higher or lower based on the desired embodiment.

The animal trap 100 depicted in FIG. 1 also includes a biasing mechanism 114, e.g. a spring, hydraulic tube, pressurized compartment, etc. for biasing the first and second portions 102, 108 towards the deployed position. Thus, the biasing mechanism may bias the first and second portions towards a deployed position upon having a trigger mechanism tripped, thereby bringing the bottom portion about adjacent to the lower end of the second portion to preferably trap a part of the animal which tripped the trigger mechanism.

In a preferred embodiment, the biasing mechanism is sufficient to hold the trapped animal as well as deploy the animal trap fast enough to trap the animal before it is able to escape. According to various approaches, the force of the biasing mechanism may range between about 3 and about 15 pounds of force in the deployed position, but may be higher or lower based on the desired embodiment. According to one approach, the biasing mechanism may be positioned between the upper end of the first portion and an upper end of the second portion.

Furthermore, the animal trap 100 includes a trigger mechanism for selectively locking the first and second portions 102, 108 in the cocked position. As depicted in FIG. 1, the trigger mechanism in one illustrative embodiment includes portions 118, 119, 120, 121, 122, 123. Note that any type of known trigger mechanism may be adapted for use with various embodiments, as will be apparent to one skilled in the art upon reading the present disclosure.

According to the present embodiment, and with particular reference to FIGS. 2, 4-5 the trigger mechanism additionally includes a trigger 124 extending between the members 110, wherein actuation of the trigger 124 causes the release of the second portion 102 and first portion 108 from the cocked position. Thereby the aforementioned biasing mechanism may quickly bias the first and second portions toward the deployed position. In one approach, the trigger may preferably be exposed when the first and second portions are in a cocked position.

Figure 4A:
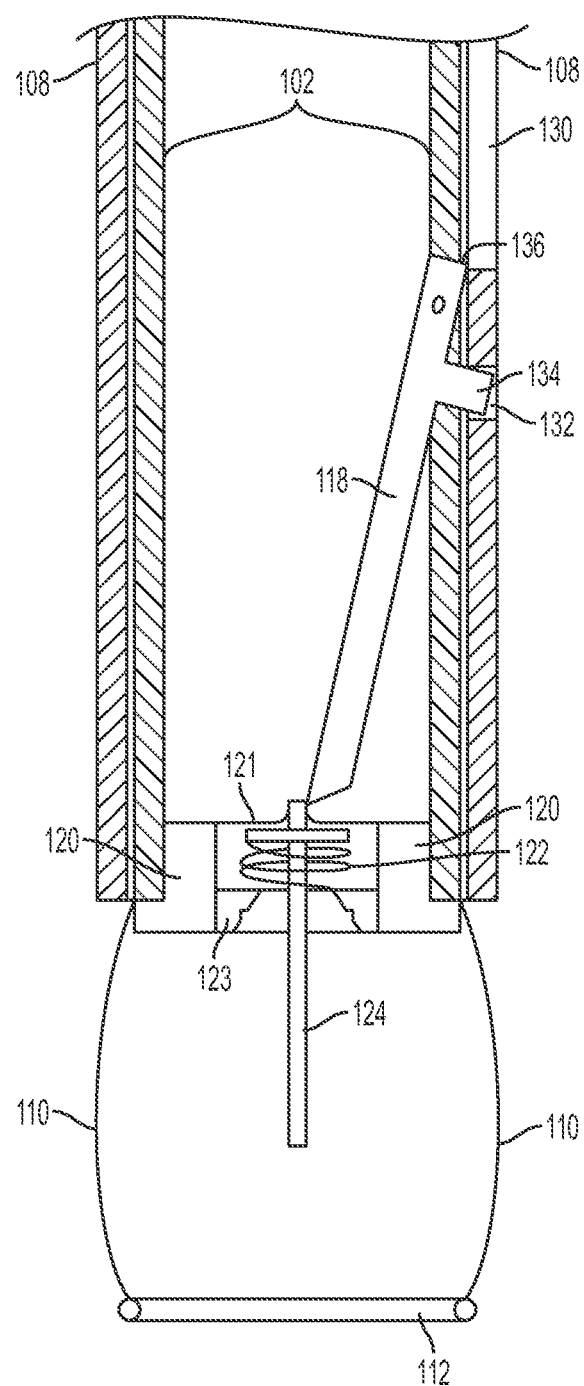
FIG. 4A is a detailed partial cross-sectional view of a cocked trigger according to one embodiment.
Figure 4B:
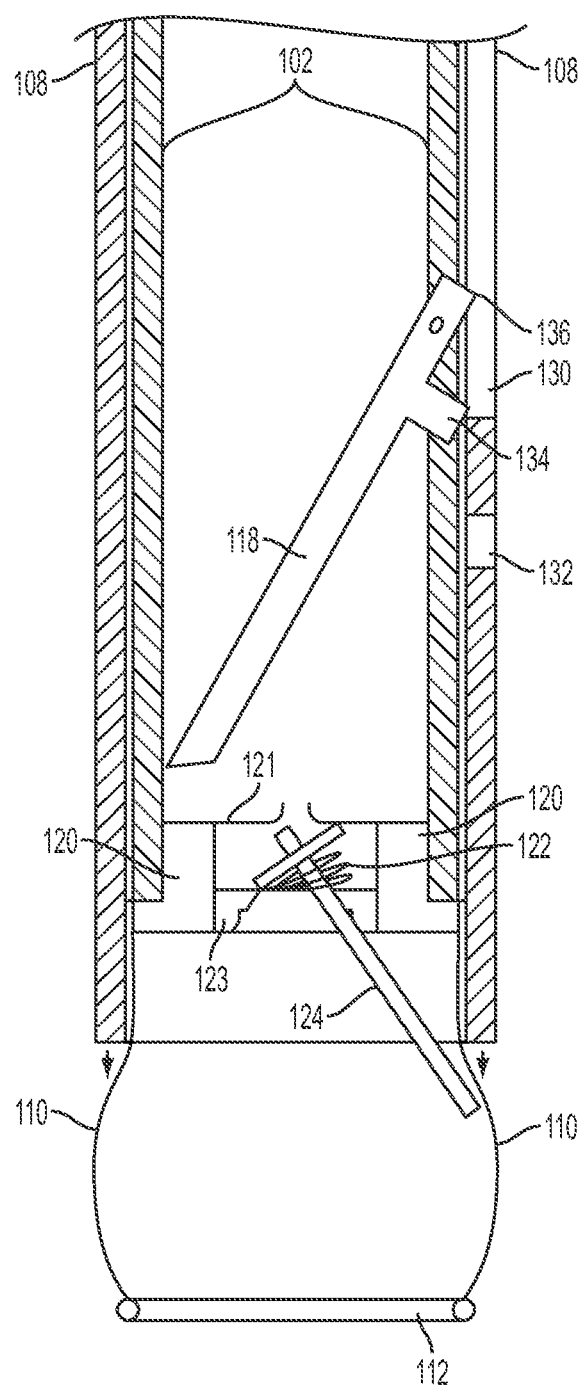
FIG. 4B is a detailed partial cross-sectional view of a deployed trigger according to one embodiment.

Referring now to FIGS. 4A-4B, the trigger mechanism is depicted in accordance with an illustrative embodiment. Moreover, portions 118, 119, 120, 121, 122, and 123 may be arranged such that a force applied to the trigger 124 about perpendicular to the longitudinal axis of the trigger 124, may allow portion 118 to shift its position, thereby releasing the second portion 102 and first portion 108 from the cocked position.

In a preferred approach, the trigger mechanism may be self-resetting, self-actuating, self-setting, etc. when the first and second portions are moved from the deployed position to the cocked position. This may be accomplished by implementing a tab, a pivoting pin, etc., such as portion 118, which may be activated by the relative motion between the first and second portions toward a cocked position. Thereby the trigger mechanism may be reset each time the first and second portions are slid into the cocked position.

In one illustrative approach, as depicted in FIGS. 1, 4A-4B, the second portion 108 includes a first slot 130 and a second slot 132. As shown in FIG. 4A, a tab 134 of the portion 118 extends into the second slot 132 when the animal trap is in the cocked position, which in conjunction with a lower end of the portion 118 abutting the upper tip of the trigger 124, locks the animal trap in the cocked position. The relative biasing of the first and second portions in the cocked position exerts a force on the tab 134 that translates into a biasing of the lower end of the portion 118 towards the trigger 124.

Referring to FIG. 4A, when the trigger 124 is tripped, the lower end of the member 118 is released, which in turn retracts the tab 134 of the portion 118 from the second slot 132, which releases the animal trap for deployment to the deployed position.

During deployment, the upper end 136 of the portion 118 is received in the first slot 130. When the animal trap is moved towards the cocked position, the bottom of the first slot 130 engages the upper end 136 of the portion 118, thereby urging the portion 118 towards a locked position, shown in FIG. 4B. Thus, the trigger mechanism in the illustrated embodiment is considered self-resetting.

In a preferred embodiment, the trigger mechanism may be omnidirectional. As used herein, an omnidirectional trigger mechanism may be tripped by a force applied to the trigger 124 along any direction in a plane oriented perpendicular to a direction of movement of the first and second portions 102, 108 between the cocked and deployed positions, e.g., the plane is perpendicular to the longitudinal axis of the trap, in the illustrate embodiment. As a result, the animal trap may be deployed such that it may have any radial orientation about its longitudinal axis without sacrificing effectiveness. This is different than conventional traps, as they usually have a one, or maybe two directional trigger, thereby requiring a specific orientation of the given trap with relation to the path of the animal in order to be effective. Thus, for the preferred embodiment, the trigger mechanism may be tripped by an animal, regardless of the radial orientation of the trap, relative to an animal. In further approaches, any type of trigger known in the art may be used, depending on the desired embodiment, as will be apparent to one skilled in the art upon reading the present disclosure.

In another approach, the trigger mechanism may be trippable by actuating the trigger in a direction about parallel to the direction of movement between the cocked and deployed positions, e.g., about along the longitudinal axis of the trap. In a further approach, the trigger mechanism may be omnidirectional as well as trippable in the direction about parallel to the direction of movement between the cocked and deployed positions.

Figure 5A:
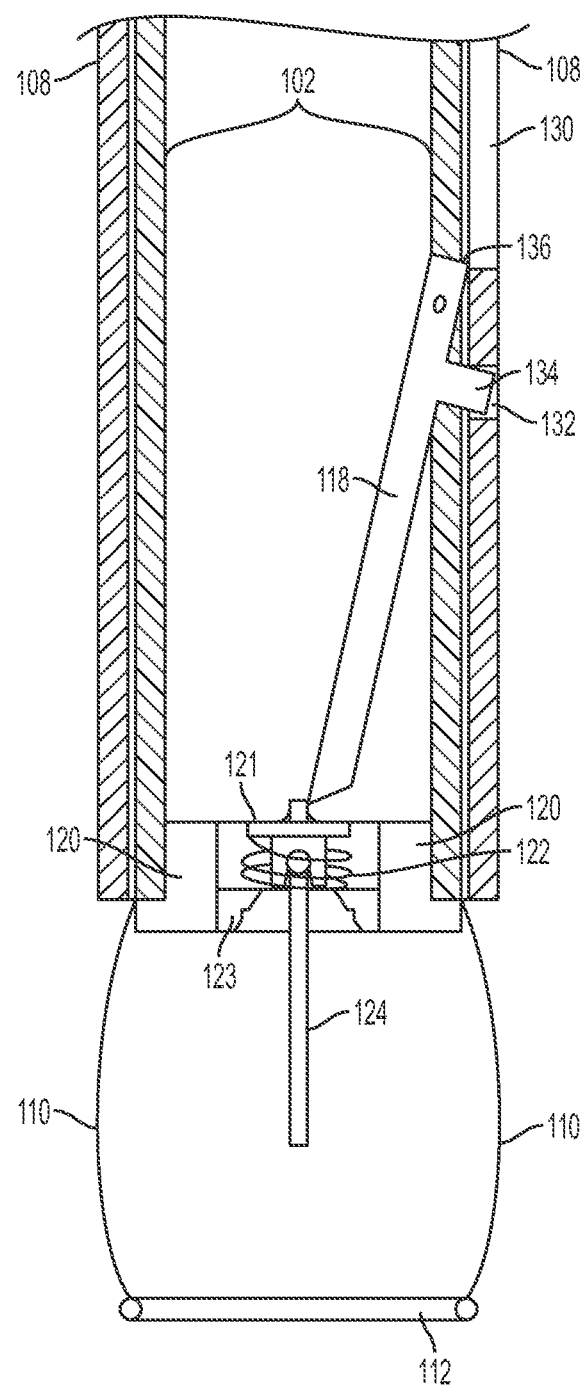
FIG. 5A is a detailed partial cross-sectional view of a cocked trigger according to one embodiment.
Figure 5B:
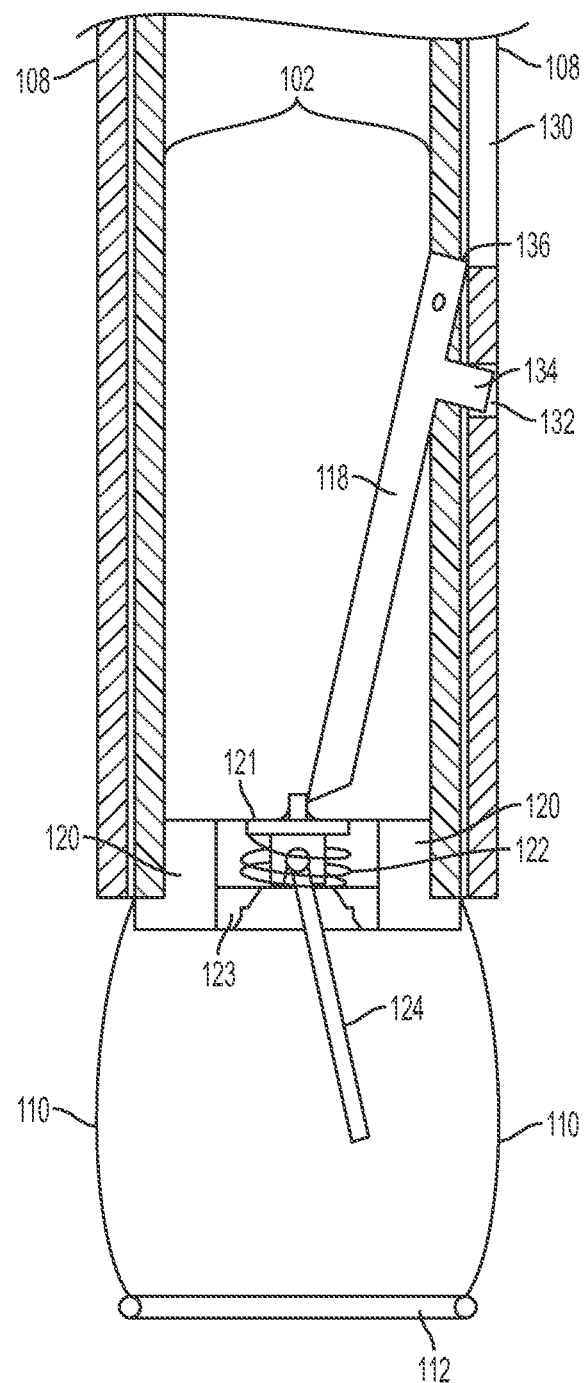
FIG. 5B is a detailed partial cross-sectional view of a cocked trigger according to one embodiment.
Figure 5C:
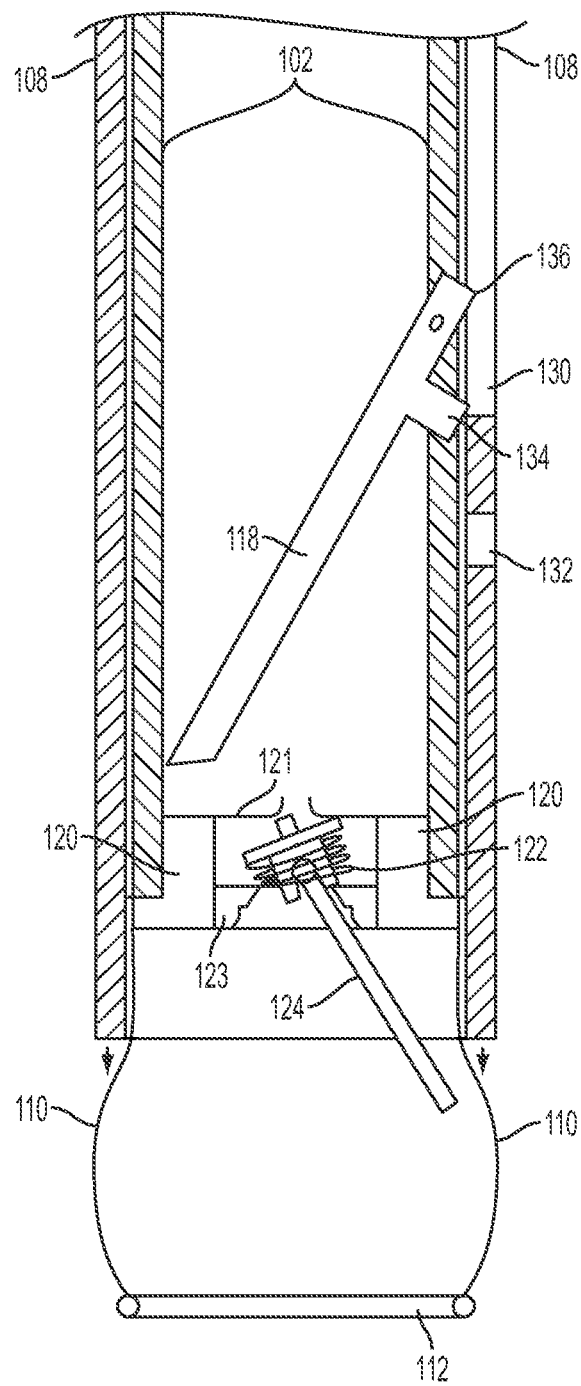
FIG. 5C is a detailed partial cross-sectional view of a deployed trigger according to one embodiment.

Referring now to FIGS. 5A-5C, there is shown an alternate embodiment of a trigger mechanism in a cocked, engaged, and deployed position, respectively. Such an embodiment allows an animal to enter farther into the area between the bottom portion 112 and the remainder of the trap. This embodiment increases the likelihood that an animal will be securely caught by presenting more of its body to the trap. This approach also reduces the likelihood that a wary animal will partially engage the trigger but back out of the trap before tripping the trigger. The trigger mechanism may include a member having an aperture that tapers together towards a receiving portion for receiving the trigger. As depicted, the trigger 124 has a bulbous end that is slidably received in the receiving portion, preferably such that the trigger mechanism may still be omnidirectional.

In a preferred approach, the trigger may preferably be short enough and/or resistive enough to allow dirt being pushed by an animal through the members, to pass by the trigger without actuating it and deploying the trap. However, the trigger may preferably be long enough and/or unconstrained enough to be actuated when an animal itself contacts the trigger.

In a preferred embodiment, the members 110 may be preferably resiliently deformable, including metals, alloys, polycarbonates, etc. or any other material not easily chewable by an animal which would be apparent to one skilled in the art upon reading the present description. In a preferred approach, the members may include spring steel, or like material. Preferably, the members are constructed of a corrosion resistant material such as stainless steel, etc.

Being resiliently deformable, the members may be able to quickly retract when the trap has been deployed without inhibiting the relative motion between the first and second portions, caused by the biasing mechanism. This may be highly desirable as to ensure that the animal is not able to escape before the first and second portions are able to reach the deployed position.

Resiliently deformable members are also capable of lateral expansion as the bottom member comes into contact with the base of a tunnel, hole, etc. when the trap is in the cocked position. See FIG. 7. This is beneficial in that the volume defined inside the members increases, thereby permitting easier entry therein to the animal. Moreover, the members bowing towards the walls of the tunnel reduces the chance that the animal will pass outside of the area between the members where the trigger resides.

Thus in one approach, the members may be primarily flexible along a single plane but not in the other planes e.g. by using a leaf type spring. As alluded to above, flex in the members may also increase the separation between the members as to allow an animal to pass through the members more easily. This may allow the trigger to become more exposed and thus more easily trippable by an animal. Therefore, the embodiments described and/or suggested herein may adjust to comply with each environment in which they are used. However, in yet another approach, the members may be rigid.

Figure 6:
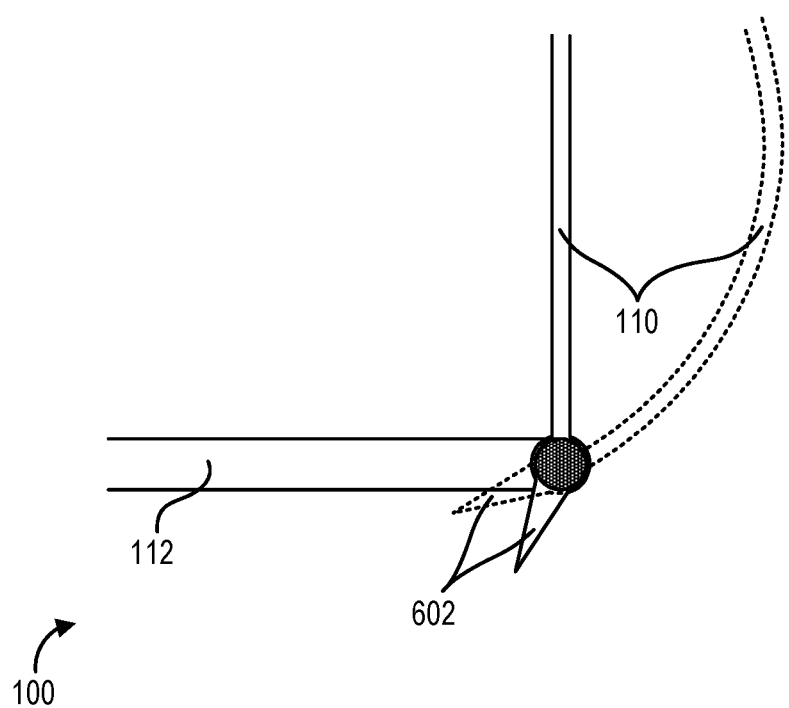
FIG. 6 is a partial detailed side view of members with feet, according to one embodiment.

Now referring to FIG. 6, according to one embodiment, the members 110 of the animal trap 100 may include feet 602 adjacent the bottom portion 112 such that the feet may urge the members to flex away from the trigger when engaging a surface (see the dotted outline in FIG. 6), such as the bottom of a tunnel. This may preferably prevent the members from flexing toward the trigger, which may either trip the trigger or block it from being tripped. According to various approaches, the feet may be extensions of the members, material attached to the members, etc.

In a preferred approach, an animal trap may include at least three members extending from the lower end of the first portion and coupled to the bottom portion, but may have more or less depending on the desired embodiment. However, if an animal trap includes less than three members, then the bottom portion connected thereto may shift or pivot during use. As a result, the bottom portion may not remain generally aligned with the longitudinal axis of the trap, and the trap may fail to capture an animal even when the animal actuates the trigger. However, such misalignment may be remedied to some extent by using wider members, such as wide leaf-spring type members that resist flexing out of a plane oriented perpendicular to the widest plane of the member. Thus, preferred embodiments have at least three members. Moreover, if the two members are aligned with the tunnel, the animal may simply walk around the members and miss the trigger.

In a further approach, the at least three members are preferably evenly spaced to ensure that the bottom member is about centered along the longitudinal axis of the animal trap. The use of three or more members may also preferably reduce dependency upon aligning any portion of the trap with the animal's path.

In one approach, an animal trap may include a stopping mechanism incorporated to stop the first and second portions at the deployed position. According to various approaches, the stopping mechanism may be a lip, a flange, etc. on the first portion, the second portion, and/or the bottom portion; a part of the trigger mechanism; etc. The stopping mechanism may be included to prevent wear on the other components of the animal trap during use, thereby increasing the effective lifetime of the animal trap.

Figure 7:
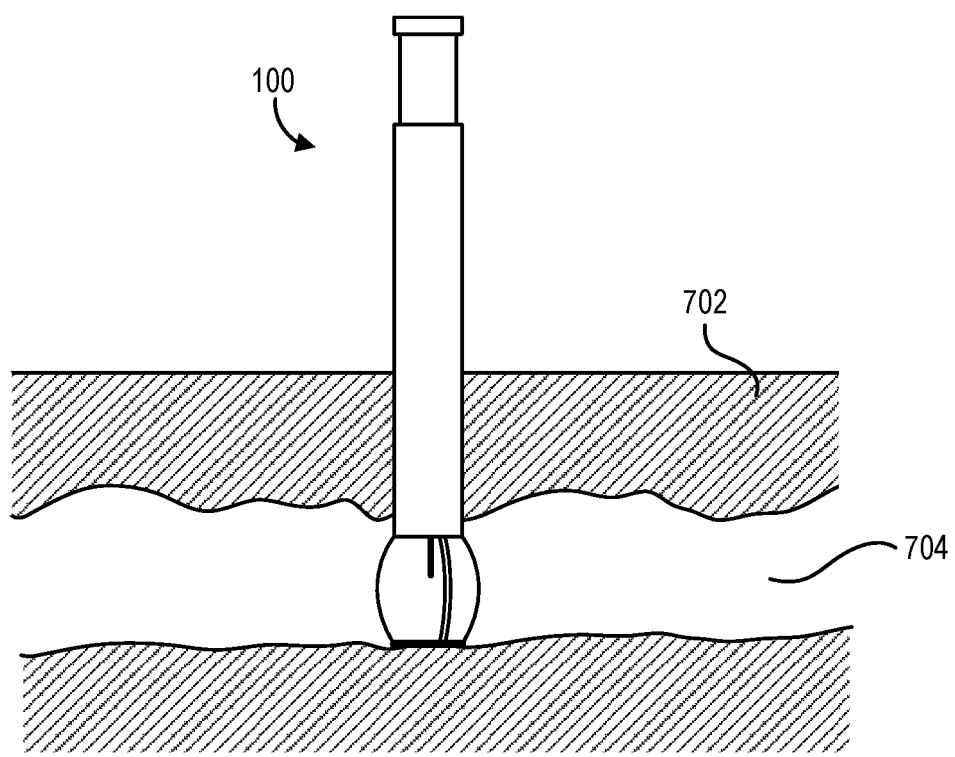
FIG. 7 is an animal trap in use, according to one embodiment.

Referring now to FIG. 7, an animal trap 100 is shown being used according to one approach. The animal trap 100 is partially submerged in the ground 702 such that it may intercept the path of an animal along a tunnel 704. In a preferred approach, when the animal trap is set, the upper end may be oriented towards the sky. In a further approach, the animal trap may be oriented such that the axis between its upper and lower ends (longitudinal axis) may be about perpendicular to the plane of the ground 702 in which it is submerged. However, the axis orientation may be angled in any manner desired based on the particular situation in which used.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An animal trap comprising:
   a first portion having an upper and a lower end;
   a second portion in sliding relationship with the first portion, wherein the first and second portions are relatively positionable between a cocked position and a deployed position;
   a biasing mechanism for biasing the first and second portions towards the deployed position;
   at least three unique members extending from the lower end of the first portion;
   a bottom portion coupled to a distal end of each of the unique members; and
   a trigger mechanism for selectively locking the first and second portions in the cocked position, the trigger mechanism having a trigger, wherein actuation of the trigger causes a release of the first and second portions from the cocked position.

2. The animal trap as described in claim 1, wherein a first end of each of the unique members is coupled to the lower end of the first portion, wherein each of the distal ends are at a second end of each of the unique members, the second end being opposite the first end along a longitudinal length of each of the unique members.

3. The animal trap as described in claim 1, wherein each of the unique members are resiliently deformable, wherein each of the unique members are more flexible along a respective single plane than along other planes.

4. The animal trap as described in claim 3, wherein each of the unique members are leaf-spring type members.

5. The animal trap as described in claim 1, wherein the unique members include feet adjacent the bottom portion, wherein each of the feet extends past the distal end of the unique member, wherein the feet urge the unique members to flex away from each other when engaging a surface.

6. The animal trap as described in claim 1, wherein the biasing mechanism is positioned entirely between the upper end of the first portion and an upper end of the second portion.

7. The animal trap as described in claim 1, wherein the trigger mechanism is self-resetting when the first and second portions are moved from the deployed position to the cocked position.

8. The animal trap as described in claim 1, wherein the trigger is actuatable by a force oriented in any direction parallel to a plane, the plane being oriented perpendicular to a direction of movement of the first and second portions.

9. The animal trap as described in claim 1, wherein the unique members protrude beyond the second portion when the first and second portions are in the cocked position, wherein the bottom portion being farther from the second portion when the first and second portions are in the cocked position than when in the deployed position, wherein the bottom portion is about adjacent a lower end of the second portion when in the deployed position, wherein the bottom portion and lower end of the second portion are close enough together to trap come in direct contact with a part of an animal and trap the part of the animal therebetween when the first and second portions are in the deployed position.

10. An animal trap comprising:
a first portion having an upper and a lower end;
a second portion in sliding relationship with the first portion, wherein the first and second portions are relatively positionable between a cocked position and a deployed position;
a biasing mechanism for biasing the first and second portions towards the deployed position;
at least three unique members extending from the lower end of the first portion;
a bottom portion coupled to a distal end of each of the unique members, the bottom portion being farther from the second portion when the first and second portions are in the cocked position than when in the deployed position; and
a trigger mechanism for selectively locking the first and second portions in the cocked position, wherein actuation of the trigger mechanism causes a release of the first and second portions from the cocked position.

11. The animal trap as described in claim 10, wherein each of the unique members protrude beyond the second portion when the first and second portions are in the cocked position, wherein the bottom portion is about adjacent a lower end of the second portion when in the deployed position.

12. The animal trap as described in claim 10, wherein each of the unique members are flexible.

13. The animal trap as described in claim 12, wherein each of the unique members are resiliently deformable.

14. The animal trap as described in claim 12, wherein each of the unique members is more flexible along a respective single plane than along other planes.

15. The animal trap as described in claim 10, wherein a first end of each of the unique members is coupled to the lower end of the first portion, wherein each of the distal ends are at a second end of each of the unique members, the second end being opposite the first end along a longitudinal length of each of the unique members.

16. The animal trap as described in claim 10, wherein the unique members include feet adjacent the bottom portion, wherein each of the feet extends past the distal end of the unique members, wherein the feet urge the unique members to flex away from each other when engaging a surface.

17. The animal trap as described in claim 10, wherein the biasing mechanism is positioned entirely between an upper end of the first portion and an upper end of the second portion.

18. The animal trap as described in claim 10, wherein the trigger mechanism has an omnidirectional trigger, wherein the trigger mechanism is self-resetting when the first and second portions are moved from the deployed position to the cocked position.

19. The animal trap as described in claim 10, wherein the trigger mechanism is actuatable by a force oriented in any direction parallel to a plane, the plane being oriented perpendicular to a direction of movement of the first and second portions.

20. The animal trap as described in claim 10, wherein the lower end of the second portion is serrated, wherein the bottom portion and lower end of the second portion are close enough together to trap a part of an animal therebetween when the first and second portions are in the deployed position, wherein the entire trigger mechanism is retracted to an interior of the second portion when the first and second portions are moved from the cocked position to the deployed position.

* * * * *